United States Patent [19]
Weber et al.

[11] Patent Number: 5,811,628
[45] Date of Patent: Sep. 22, 1998

[54] METHOD FOR THE COMPLETE HYDRODECHLORINATION OF CHLORINATED HYDROCARBONS

[75] Inventors: Klaus Weber, Duerrenberg; Rainer Schoedel, Halle; Peter Birke, Langenbogen; Reinhard Geyer; Ulrich Neumann, both of Halle; Werner Haertwig, Sandersdorf; Gerhard Vogel, Muehlbeck; Willi Sattelmayer, Sandersdorf; Rudolf Schumann, Raguhn; Anette Hoppe, Bitterfeld, all of Germany

[73] Assignees: Leuna-Katalysatoren GmbH, Leuna; Buck Werke GmbH und Co., Reichenhall, both of Germany

[21] Appl. No.: 504,628

[22] Filed: Jul. 20, 1995

[30] Foreign Application Priority Data

Jul. 26, 1994 [DE] Germany ............... 44 26 391.0
Aug. 22, 1994 [DE] Germany ............... 44 29 702.5

[51] Int. Cl.$^6$ ............... C07C 1/26; B01J 20/34
[52] U.S. Cl. ............... 585/733; 502/38; 502/53; 502/56
[58] Field of Search ............... 585/733, 638, 585/641, 642; 502/38, 53, 56

[56] References Cited

U.S. PATENT DOCUMENTS

| | | | |
|---|---|---|---|
| 3,634,292 | 1/1972 | Hayes ............... | 252/415 |
| 3,855,347 | 12/1974 | Oricchio ............... | 260/683.9 |
| 4,524,234 | 6/1985 | Kaiser ............... | 585/638 |
| 5,155,075 | 10/1992 | Innes et al. ............... | 502/52 |
| 5,177,268 | 1/1993 | Balko et al. ............... | 568/726 |

FOREIGN PATENT DOCUMENTS

| | | |
|---|---|---|
| 0432323A1 | 6/1991 | European Pat. Off. . |
| 0442236A1 | 8/1991 | European Pat. Off. . |
| 0455547A1 | 11/1991 | European Pat. Off. . |
| 523553 | 1/1993 | European Pat. Off. . |
| 545509 | 6/1993 | European Pat. Off. . |
| 0570050A1 | 11/1993 | European Pat. Off. . |
| 2164074 | 6/1973 | Germany . |
| 3422348 | 12/1985 | Germany . |
| 4012007A1 | 10/1991 | Germany . |
| 4200790A1 | 7/1993 | Germany . |

*Primary Examiner*—Glenn Caldarola
*Assistant Examiner*—Thuan D. Dang
*Attorney, Agent, or Firm*—Jordan and Hamburg

[57] ABSTRACT

A method for the hydrodechlorination of a reaction gas primarily composed of chlorinated hydrocarbons is carried out sequentially. A first step is advantageously carried out in a tubular reactor filled with catalyst and cooled externally, to maintain a temperature within a preferred range of 80° to 230° C. and a radial temperature difference of not more than 40° C. Hydrogen is added to the tubular reactor with a hydrogen excess in a preferred range of 1.1 to 1.5 relative to the reaction gas, based on the stoichiometric consumption. The catalyst is present in a catalyst loading in a preferred range of 0.1 to 1.5 v/vh based on the volume of reaction gas. A fixed bed reactor is advantageously used for a second step, optimally connected in straight transit with the output of the reactor of the first step. The full-space reactor is maintained at a temperature within a preferred range of 200° to 300° C. and a hydrogen excess relative to the stoichiometric consumption is in a preferred range of 2 to 100. Catalyst is present in a preferred amount related to a volume of catalyst in step one according to a ratio in a range of 2:1 to 10:1. The dechlorination is preferably carried out at pressures between 1 and 50 bar. A method is further provided for regenerating deactivated catalysts without accumulation of dioxin in the waste gas, achieved by a reducing treatment, followed by an oxidizing treatment at a temperature at or above the last operating temperature of the catalyst.

19 Claims, No Drawings

METHOD FOR THE COMPLETE HYDRODECHLORINATION OF CHLORINATED HYDROCARBONS

BACKGROUND OF THE INVENTION

The invention relates to a method for the complete catalytic hydrodechlorination of chlorinated hydrocarbons as well as of mixtures of predominantly chlorinated hydrocarbons.

Chlorinated hydrocarbons are obtained in large quantities annually as by-products of industrial processes. They occur generally as mixtures of different chlorinated hydrocarbons with other hydrocarbons, water and other materials. Since it is hardly possible to utilize these materials or mixtures directly and since, for reasons of protecting the environment, they cannot be deposited on garbage dumps or released into the atmosphere, they must be eliminated in other ways. The main method is the dechlorination of chlorinated hydrocarbons, usable compounds, such as hydrogen chloride and hydrocarbons, being obtained predominantly as end products.

Numerous methods have heretofore been used for the dechlorination of chlorinated hydrocarbons. Noncatalytic methods, such as the treatment with metallic sodium, UV irradiation, high-temperature pyrolysis and high-temperature incineration are known. These methods have the disadvantage that, on the one hand, they result in high costs and, on the other, lead to new by-products, which are toxic and/or are disposed of only with difficulty.

Of the known catalytic methods, catalytic combustion and the hydrogenating dechlorination are known. The danger of forming dioxins and the combustion of valuable hydrocarbons are disadvantages of known catalytic combustion methods. To eliminate these disadvantages, several catalytic, hydrogenating dechlorination methods were therefore developed, which focus particularly on the use of specific catalysts.

For example, a supported catalyst with 0.01 to 5% by weight of rhodium in combination with other metals and metal compounds is described in German patent 2,164,074. It is stated that advantageous results may be achieved if the hydrodechlorination reaction is carried out in a tubular reactor with the catalyst permanently disposed in the tubes. The reaction tubes may have a length of 2 to 8 m and an internal diameter of 20 to 50 mm. The high cost of the catalysts is one disadvantage of this method. In addition, our own experiments with such catalysts and under the reaction conditions described showed that a specified residual content of 1,2-dichloropropane in the reaction gas of not more than 1 vpm can be achieved only up to 450 hours. This result, which is in agreement with the information in German patent 4,200,790, makes it necessary to regenerate the catalyst frequently or requiring removal of the remaining chlorinated hydrocarbons from the reaction gas in a subsequent expensive purification step.

A clay supported catalyst, which is doped with metals of the 8th subsidiary group of the periodic tables, predominantly with platinum, and acted upon with oxygen-containing hydrogen, is disclosed in European patents 0455 547 and 0570 050. However, despite optimization of the reaction conditions and of the specific catalyst surface, conversions of only 95% of the chlorinated hydrocarbons used are achieved. At the same time, new, undesirable chlorinated hydrocarbons are formed. The lifetime in a laboratory reactor with a diameter of 10.2 mm did not exceed 137 hours.

A longer catalyst life for the hydrodehalogenation is said to be attained by the catalyst, which is described in German patent 4,200,790. Such catalyst is resistant to hydrogen halides and consists of a basic iron and/or nickel alloy coated with titanium oxide and contains chromium as well as other hydrogenating components. This complicated catalyst, which was used in a tubular flow reactor with a length of 300 mm and an internal diameter of 32 mm, admittedly shows less HCl damage and fewer hydrocarbon deposits than do aluminum oxide-supported catalysts and also does not cause any new chlorinated hydrocarbons to be formed. However, the conversion of dichloropropane achieved in a proportional amount less than 50% is unsatisfactory and requires an expensive separation of the reaction products and a recycling of the chlorinated hydrocarbons.

In contrast to the aforementioned dechlorination methods which use defined chlorinated hydrocarbons or mixtures thereof, the possible use of industrial mixtures of chlorinated hydrocarbons and also hydrocarbons, such as those obtained, for example, during the synthesis of propylene oxide by the chlorohydrin method, is pointed out in German patent 4,012,007. Activated charcoal, which can be disposed in tubes of or on bases of or in the form of a compact filling in a suitable apparatus, is named as catalyst. The increased formation of carbon and the deactivation of the catalyst resulting from the use of industrial charging mixtures, is compensated for by the use of a comparatively inexpensive catalyst, which does not contain noble metals. As expected, however, the activated charcoal catalyst attained high conversions but only a poor selectivity at temperatures of about 500° C. For example, if pure 1,2-dichloropropane is charged, considerable amounts of chloropropenes are formed, the removal of which from the reaction gas is associated with high costs.

Aside from all of these methods of catalytic hydrodehalogenation which are characterized mainly by the use of a particular catalyst, few patents contain technological or industrial measures directed to their use.

Only the EP 0432 323 discloses a 3-step method for the simultaneous hydrodehalogenation of two streams, which contain, on the one hand, unsaturated halogenated hydrocarbons and, on the other, saturated halogenated hydrocarbons. The 2-step nature of the method is intended to ensure a minimum of polymerization. The high residual contents of halogenated hydrocarbons, which amounted to 1% by weight when choropropanes were used, and also still constituted up to 1,000 ppm by weight even when a third reaction step was included, demonstrates a disadvantage of this method. Moreover, the proposed cycling of the hydrogen gas and, particularly, the necessary separation of the light hydrocarbons formed, require elaborate and expensive equipment.

Finally, U.S. Pat. No. 3,855,347 is mentioned. An $SiO_2$/$Al_2O_3$ support catalyst, which is doped with metals of the 8th subsidiary group of the periodic table, is used in a fluidized bed for this method. By these means, poor product distribution, a low conversion, high carbonization and frequent stoppages, which are listed as disadvantages of a solid bed, are to be avoided. The method, however, cannot do justice to this claim with the residual contents of 1.4% and 0.5% of chlorinated hydrocarbons attained, which can be accounted for by the broad distribution of residence times in the fluidized bed reactor. Furthermore, increased abrasion of the catalyst occurs with this method, the factor being associated with the incidence of toxic dusts.

On the whole, all known methods of catalytic hydrodechlorination have serious deficiencies. These relate, for instance, to the short life of the catalyst, the need to purify the reaction gas from unreacted chlorinated hydrocarbons, the gas-cycling procedure and the fact that industal mixtures cannot be processed. Despite the known disadvantages of the high-temperature incineration, which is the predominant method used, catalytic hydrodechlorination has therefore not attained great industrial relevance heretofore.

OBJECTS AND SUMMARY OF THE INVENTION

An object of the invention is a method for the catalytic hydrodechlorination of chlorinated hydrocarbons as well as of industrial mixtures consisting predominantly of chlorinated hydrocarbons partly or completely overcomes the disadvantages of the known method.

It is a further object of the invention to arrange the implementation of the catalytic hydrodechlorination reaction in such a simple manner, that the useful life of the catalyst is extended and, at the same time, ensuring complete conversion of the charging stock, which predominantly contains chlorinated hydrocarbons, and of any chlorinated hydrocarbon-containing intermediates, while at the same time a less expensive solution to the problem of the overall technology is achieved and any deactivated catalyst may be reactivated completely without the accumulation of dioxins in the waste gas.

The above stated objectives are accomplished by a catalytic hydrodechlorination of chlorinated hydrocarbons and of industrial mixtures of predominantly chlorinated hydrocarbons in the gas phase, in which, pursuant to the invention, the hydrodechlorination is carried out in a straight transit in two steps at pressures of 1 to 50 bar, the first step being carried out in one or several tubular reactors, the tubes of which are filled with catalysts and the periphery of which is cooled, at a radial temperature difference in the tubes of, at most, 40° C., and the second step being carried out in a fixed bed reactor at 200° to 350° C. Pursuant to the invention, only a slight excess of hydrogen, based on the stoichiometric consumption, is used in the first step. The values lie between 1.1 and 2.0 and preferably between 1.2 and 1.5. In the second step, the hydrogen excess is greater, ranging between 2 and 100 and preferably 10 and 50. The ratio of catalyst volume in the first step to that in the second step is between 2:1 and 10:1.

DETAILED DESCRIPTION OF THE PREFERRED EMBODIMENT

Pursuant to the inventive method, the completely hydrodechlorinated reaction gas is purified absorptively after the second step in a known manner with the formation of hydrochloric acid from the hydrogen chloride, and the purified gas discharged subsequently to be utilized as such or as a source of energy.

Very high conversions of chlorinated hydrocarbons are achieved with the inventive method while, at the same time, the useful life of the catalyst is comparatively long. Chlorine-containing decomposition products of the dechlorination are included in the high conversion. Overall, chlorinated hydrocarbon conversions of more than 99.95 percent and residual contents of chlorinated hydrocarbons of less than 1 vpm after absorption of the hydrogen chloride are typical.

In contrast to other methods, no significant decomposition reactions of the chlorinated hydrocarbons were detected. Consequently, the hydrocarbon-containing residual gas, after removal of the HCl, can be used directly as such and/or as a source of energy.

The advantages listed are achieved also if industrial mixtures, such as those arising during the synthesis of propylene oxide by the chlorohydrin method or as distillation residues during the synthesis of chloromethanes, are hydrodechlorinated pursuant to the invention.

The high overall conversion achieved by the inventive method enables a very pure hydrochloric acid to be produced as a by product which, when concentrated, for example, to 30% by weight of HCl, contains less than 5 mg/L of chlorinated hydrocarbons.

Within the scope of the inventive measures, it is advantageous if the reaction conditions in the first step are adjusted so that a conversion of more than 95% and, preferably, more than 99% of the chlorinated hydrocarbons, is achieved in this step.

It was found that such high conversion in the first step is achieved at reaction temperatures of 80° to 230° C. and at slight stoichiometric excesses of hydrogen of 1.1 to 2.0 and with a catalyst loading of 0.1 to 1.5 v/vh. As a result, the costs of heating the reaction mixture are low and the process can be run in a simple manner in straight transit, that is, without expensive purification and recycling of hydrogen-rich cycling gases.

It was found that different hydrodechlorination catalysts can be used for the inventive method. The highly active and selective noble metal supported catalysts, which contain, for example, the elements of the 8th subsidiary group of the periodic table or their compounds on supports such as clay/silica mixtures, aluminosilicates and others, are particularly advantageous. Surprisingly, it was noted that the inventive method leads to a significant increase in the useful life of the catalyst without requiring regeneration. However, this depends also on the type of catalyst.

In the second step, which is preferably carried out in an adiabatic fixed bed reactor, the hydrodechlorination catalyst of the first step as well as a different catalyst, can be used. A less expensive catalyst, however, such as one with a lower noble metal content, is advantageously used in the second step. The catalyst volume in the second step, which is less than that of the first step by a factor of 2 to 10, also proves to be economically beneficial.

Pursuant to the invention, a tubular reactor is used in the first step, so that, despite the extremely high evolution of heat, a reaction temperature of 80° to 230° C. can be maintained. At the same time, radial temperature differences of more than 40° in the catalyst filling can be avoided by means of this type of reactor, preferably in conjunction with evaporative cooling in the jacket space. The internal diameter of the individual tubes of the tubular reactor are advantageously between about 15 to 50 mm for this purpose.

A particularly energy efficient embodiment of the inventive method is provided when the chlorinated hydrocarbons or mixtures of predominantly chlorinated hydrocarbons, which are to be disposed of, are used for the evaporative cooling of the tubular reactor.

By suitable technical and technological measures, such as the adjustment of a forced flow in the jacket of the tubular reactor, partial, selective evaporation of the chlorinated hydrocarbon-containing mixture can also be achieved. The evaporative cooling can thus be used additionally to permit the distillative concentration of the chlorinated hydrocarbons or removal of undesirable, higher boiling components. For example, it was found that it is possible in this way, by means of a simple evaporation, to increase the 1, 2-dichloropropane content in the vapor phase of an industrial dichloropropane fraction, which contains approximately 83% by weight of 1,2-dichloropropane, approximately 14% by weight of dichlorodiisopropyl ether, approximately 2% by weight of epichlorohydrin as well as small-amounts of other chlorinated hydrocarbons and hydrocarbons, to more than 98% by weight.

The reaction temperature in the first step is controlled as a function of the heat of reaction which is to be dissipated, by means of the boiling temperature of the cooling medium. This temperature, in turn can be varied simply with the help of the pressure in the cycle.

A characteristic feature of the inventive method consists therein that the temperature in the second step generally is higher than that in the first step. The necessary increase in temperature can be achieved, for example, by an interposed heater.

It is particularly advantageous and effective for the subsequent reaction in the second step if a small amount of air, such as 0.5 to 5%, is metered into the gas stream before it enters the second step, so that the increase in temperature is brought about partly or completely by a partial combustion in the fixed bed reactor.

A further advantage of the inventive method consists therein that both steps of the method can be started simultaneously by heating with a stream of hydrogen.

It was furthermore found that deactivated hydrodechlorination catalysts, which contain noble metals on a support, can regain the activity level of fresh, unused catalyst by a regeneration treatment. If the catalyst requires regeneration after a long period of use, this is done by the following steps:

a) treating the catalyst at the final temperature of the catalytic hydrodechlorination over a period of 0.5 to 10 hours and preferably of 3 to 5 hours with hydrogen, b) then heating it in a stream of hydrogen to a temperature of 350° to 530° C. and preferably of 420° to 490° C. and subsequently flushing it for 1 to 10 hours in a stream of hydrogen in this temperature range c) thereupon deactivating it with nitrogen and d) subsequently treating it stepwise with an oxygen containing inert gas mixture at temperatures ranging from 350° to 500° C. and preferably from 440° to 490° C.

Possible ways of regenerating specifically noble metal-containing hydrodechlorination catalysts were previously not known. Such aged catalysts differ from other catalysts in that they contain chlorine-containing coke; chlorine contents of 8 to 18% by weight were measured. For the following reasons, it is therefore not possible to use the regeneration methods conventionally used for aged hydrocarbon-converting catalysts:

The burning off (as in U.S. Pat. No. 3,634,292) of the chlorine-rich coke can lead to high dioxin concentrations in the waste gas.

The simultaneous action of oxygen and of chlorine compounds or the reductive treatment at temperatures of 550° to 650° C. (as in the German patent 3,422,348) can lead to changes in the size distribution of the metal crystallites.

It is essential for the regeneration described above in accordance with the invention that a reducing treatment precede the oxidizing treatment of the spent catalysts and, moreover, does so at the last operating temperature of the catalyst. Advantageously, the regeneration is therefore carried out immediately following the completed hydrodechlorination reaction. It is, however, also possible to regenerate already charged catalysts in this manner. For this purpose, however, they would have to be heated initially to the last operating temperature, before the hydrogen treatment can take place.

The gas loadings in the case of hydrogen, nitrogen and oxygen treatments can in each case be between 100 and 10,000 v/vh.

The preferred loadings, at which the treatments with mixtures of inert gas with hydrogen, nitrogen or oxygen are carried out, correspond to values of 500 to 2000 v/vh.

Burning off the coke with the oxygen-containing inert gas mixture initially is commenced with low oxygen concentrations. Advantageously, the initial concentration is 0.3% by volume of oxygen. In the course of the regeneration, the oxygen concentration is increased stepwise, so that the temperature of the catalyst does not exceed 500° C. Preferably, the temperature should fall within the range of 440° to 490° C.

The course of the burning off of the coke can be monitored by way of the carbon dioxide content of the waste gas. With this type of regeneration, dioxins are not detected in the waste gases.

The invention is described in greater detail below by the following examples.

EXAMPLE 1

The catalytic hydrodechlorination is carried out in a 2-step experimental installation, consisting of a tubular reactor for the first step, and a fixed bed reactor for the second step.

The tubular reactor consists of an inner tube with a 32 mm internal diameter and a jacket tube with a 200 mm internal diameter. In the inner tube, an axial shield tube with a diameter of 8 mm is disposed, in which the temperature of the interior is measured over the height of the catalyst filling by means of an axially displaceable thermocouple. At the same time, over radial temperature sensors, which are inserted into the jacket from the outside and sealed, the wall temperature of the inner tube is measured at 3 places. The jacket is provided with a gauge glass as well as with a lower charging nozzle for the cooling medium and a larger, upper discharging nozzle for the vapors or the partially evaporated cooling medium. The overall height of the tubular reactor is approximately 2,500 mm.

Next to the tubular reactor, a fixed-bed reactor, with an internal diameter of 60 mm and an overall height of about 500 mm, is disposed. As in the case of the tubular reactor, there is a shield tube with a displaceable thermocouple for the axially dependent temperature measurement in the filling. The fixed bed reactor is provided with an insulation 100 mm thick and operated almost adiabatically.

The inlet temperature into the second step is adjusted by means of heating tapes, which are wound around the line connecting the two reactors. In addition, air can be metered over a T portion in this connection line into the reaction mixture, before the latter enters the second step. At the same time, this T portion can also be used for taking samples after the first step.

The experimental installation furthermore includes, as equipment upstream from the tubular reactor:

a rotameter for measuring the gas streams, a metering pump for the charging stock containing chlorinated hydrocarbons, an evaporator for the charging stock containing dechlorinated hydrocarbons, a mixing segment, a heater for preheating the reaction mixture to the inlet temperature in the first step as well as equipment downstream from the fixed bed reactor:

a packed column for absorbing HCl, a packed column for neutralizing HCl residues with sodium hydroxide solutions, a control valve for adjusting the reaction pressure, a sampling nozzle with valve and tubing for gas chromatographs coupled on-line.

A noble metal supported catalyst (1,600 mL), which contains 3% by weight of palladium on aluminosilicate (42% by weight of silica) and is strand-shaped (with a diameter of 1.8 mm) is added to the tubular reactor of the first step.

The fixed-bed reactor of the second step is filled with 340 mL of a supported catalyst of die same shape, which also contains palladium. However, the palladium content is only 0.5% by weight. The ratio of the catalyst volume of the first step to that of the second step therefore is 4.7:1.

The catalysts are activated and the two steps started up with a stream of hydrogen of 800 L per hour at atmospheric pressure and a heating rate of 15° C. per hour. During this phase, the jacket of the tubular reactor remains empty. After a temperature of 300° C. is reached in both reactors, this temperature is maintained for 5 hours, after which the two catalysts are cooled in a stream of hydrogen to the starting temperature of 130° C.

Subsequently, the jacket of the tubular reactor is filled to a level of 80% with condensate and, despite the evaporative cooling that is commencing, this level is maintained by the addition of further condensate.

At the same time, the heating tapes between the first and second steps are turned on and the temperature of the second step is increased to 200° C. The reaction pressure is adjusted to 3.5 bar.

Parallel to these starting up steps, 350 mL of 1,2-dichloropropane are injected and the flow of hydrogen is adjusted to 195 L/h. This corresponds to an excess of hydrogen beyond the stoichiometric consumption of approximately 1.2. The gas inlet temperature into the tubular reactor is adjusted to 120° C.

Under these conditions, the hydrodechlorination reaction of the dichloropropane, which is associated with a detectable HCl formation (which can be made visible in the HCl absorption column) and a strong evolution of heat and intensive evaporative cooling, ignites in the tubular reactor. A temperature maximum of approximately 200° C. is formed along the catalyst filling of the tubular reactor. The measured, radial temperature differences in the tube remain below 30° C.

After 5 hours of experimental operation, gas analysis reveals a dichloropropane conversion of 99.1% after the first step and a residual chlorinated hydrocarbons content of less than 1 vpm after the second step, in which the hydrogen excess is more than 50 based on the stoichiometric consumption, and after the downstream absorption and neutralization of the HCl.

No hydrocarbons other than propane are detected in the residual gas.

The hydrochloric acid (29% by weight of HCl) formed during an experimental period of 9 hours contains less than 3 mg/L of chlorinated hydrocarbons.

This procedure with 1,2-dichloropropane as charging stock is continued for a period of 1,200 hours. Small temperature shifts in the two steps are compensated for by the heater or the heating tapes. No decrease in the conversion can be detected during this time. A decrease in conversion could not be detected during this time.

In the meantime, evaporative cooling is switched over from water to dichloropropane during this first period of operation. Evaporative cooling with dichloropropane functions equally well.

After this first period of operation, the experimental installation is operated in a second period of operation, without regeneration of the catalysts, also over 1,200 hours and under the same catalyst loading with an industrial dichloropropane fraction of the following composition:

82.6% by weight of 1,2-dichloropropane
2.3% by weight of epichlorohydrin
0.2% by weight of propylenechlorohydrin
0.49% by weight of trichloropropane
14.3% by weight of dichlorodiisopropyl ether remainder: water.

Complete hydrodechlorination of this mixture, which is obtained during the synthesis of propylene oxide is also possible. The hydrogen excess in the first step is 1.5 times the stoichiometric value and, in the second step, 65 times the stoichiometric value. The temperature is increased stepwise to 220° C. in the first step and to 310° C. in the second step.

Evaporative cooling is carried out with water or with an industrial mixture, which is pumped with the aid of a metering pump through the jacket of the tubular reactor and partially evaporated there.

In a third period of operation, trichlorobenzene is dechlorinated subsequently without regeneration over a period of 350 hours. The catalyst loading of the first step is 1.0 v/vh. At the same time, with the same excess of hydrogen, the pressure drops to atmospheric and the temperature falls to 140° C. in the first step and to 220° C. in the second step. Complete conversion of the trichlorobenzene is also achieved here and synthesis reactions are not detected.

In continuing the long-term test, a chlorinated hydrocarbon-containing residue from the production of chloromethanes was dechlorinated. The main constituents of this industrial mixture are:

77.0% by weight of tetrachloromethane
3.0% by weight of chloroform,
4.5% by weight of trichloroethene
1.3% by weight of tetrachloroethane
1.8% by weight of perchloroethane
2.7% by weight of 1,2-dichloroethane
6.4% by weight of 1,1,2-trichloroethane remainder: higher chlorinated hydrocarbons The catalyst loading, based on the liquid charging stock, is 0.17 v/vh and the hydrogen excess, based on the stoichiometric consumption, is 2.0 in the first step and 40 in the second step. The pressure is 5 bar. At the start of this fourth period of operation, a reaction temperature of not more than 250° C. is set in the first step and of not more than 300° C. in the second step. The residual chlorinated hydrocarbon content, measured after the neutralization step is, less than 1 vpm and the hydrochloric acid produced contains less than 5 mg/L of chlorinated hydrocarbons. For this industrial mixture and with vaporizing condensate as a cooling agent, a radial temperature difference of less than 25° C. is measured in the reactor.

Even after an experimental period of 450 hours with this mixture, the conversion of the chlorinated hydrocarbons is still complete, the temperature being increased stepwise for this purpose to 230° C. in the first and 350° C. in the second step. The second step is heated by a heating tape as well as by metering 0.1% by volume of oxygen into the gas stream before it enters this step. If the supply of oxygen is interrupted and the heating equalized with the heating tape, an increase in the chlorinated hydrocarbons in the residual gas from 0.3 vpm to 0.5 vpm is noted.

The carbon content of the catalysts, which are subsequently removed from the first and second steps, and which have hydrodehalogenated different chlorinated hydrocarbons or industrial mixtures of predominantly chlorinated hydrocarbons completely without regeneration for 3,200 hours, is 8.3% by weight for the catalyst of step one and 2.1% by weight for the catalyst of step two. This demonstrates that only small portion of the catalyst, particularly that of the second step, has been consumed.

EXAMPLE 2

In the experimental installation similar to that of example 1, 600 mL of a clay support catalyst with 1% by weight of rhodium, described in the German patent 2,164,074, is filled into the reaction of the first step and 570 mL of a clay supported catalyst with only a 0.3% by weight of rhodium is filled into the reactor of the second step. Both catalysts are spheres with a diameter of 1.8 to 2.3 mm. The catalysts are activated and started up as described in Example 1. In a first period of operation, distilled 1,2-dichloropropane, with a purity of more than 99.7% by weight, is used. The reaction conditions are as follows:

| 1st Step | catalyst loading | 0.2 v/vh |
| --- | --- | --- |
| | reactor inlet temperature | 160° C. |
| | maximum reaction temperature | 200° C. |
| | hydrogen excess based on the stoichiometric consumption: | 1.8 |
| | reaction pressure: | 1.2 bar |
| 2nd Step | reaction temperature: | 250° C. |
| | hydrogen excess based on the stoichiometric consumption: | 10 |
| | reaction pressure: | 1.1 bar |

The measured chlorinated hydrocarbon contents in the residual gas after the HCl absorption and neutralization are less than 1 vpm and in the hydrochloric acid less than 3 mg/L. The radial temperature gradient in the first reactor is 22° C. with water as the cooling medium, and 26° C. with dichloropropane as the cooling medium. After a total reaction time of 480 hours and continued complete conversion of the chlorinated hydrocarbons, the charging stock is changed over from distilled 1,2-dichloropropane to an industrial dichloropropane mixture, as described in example 1 (2nd period of operation).

The following parameters are required to ensure a complete conversion as well as a hydrochloric production of good quality HCl:

| 1st Step | catalyst loading: | 0.2 v/vh |
| --- | --- | --- |
| | reactor inlet temperature: | 175° C. |
| | maximum reaction temperature: | 215° C. |
| | hydrogen excess, based on the stoichiometric. consumption: | 2.0 |
| | reaction pressure: | 4.0 bar |
| 2nd Step | reaction temperature: | 300° C. |
| | hydrogen excess, based on the stoichiometric consumption: | 8 |
| | reaction pressure: | 3.9 bar |

The maximum radial temperature gradient in the first reactor with evaporative cooling with water is 36° C.

In the course of long-term experiments with industrial mixtures of dichloropropanes, the reaction temperatures are increased stepwise, the other conditions remaining the same, in order to continue to ensure complete conversion. The limiting temperatures of 230° C. in the first step and 350° C. in the second step are reached after 315 hours. A further increase in temperature is not advisable because of the danger of increased synthesis reactions. The removal of the two catalysts and a subsequent analysis showed a carbon content of 12.3% by weight for the catalyst the first step and of 8.7% by weight for the catalyst of the second step.

Examples of the Regeneration of the Catalysts

Regeneration Example 1

A spent Pt-Al$_2$O$_3$ catalyst (100 mL) with 5% by weight of platinum is treated immediately after the catalytic hydrodechlorination of 1,2-dichloropropane over a period of 3 hours with 50 L/h of hydrogen at the last operating temperature of the catalyst of 300° C. Subsequently, under the same flow conditions, the catalyst is heated at a rate of 4° C. per minute to 470° C. and flushed with hydrogen for 3 hours at this temperature. Thereupon, the catalyst is inactivated with nitrogen until hydrogen can no longer be detected at the outlet of the reactor. After that, the catalyst is treated at a loading of 700 v/vh in each case for 3 hours with mixtures of oxygen and nitrogen of increasing oxygen content in the following steps: 0.3, 0.6, 1.3, 3, 6 and 14% by volume of oxygen. No dioxin was detected in the analysis of the waste gases.

The catalyst, regenerated in this manner, is tested in a laboratory test under the following conditions with respect to its catalytic activity:

The catalyst (100 mL) is transferred to a tubular reactor having a length of 60 cm and a diameter of 1.6 cm. In order to activate it, the catalyst is heated at a rate of 5° C./min to 300° C. and kept for 2 hours at this temperature under a stream of hydrogen. After the catalyst has cooled to a temperature of 120° C., a mixture of 20 mL of 1,2-dichloropropane per hour and 20 L of hydrogen per hour at atmospheric pressure is passed through the catalyst filler. After a reaction time of 2 hours, the gas leaving the reactor is analyzed by gas chromatography. The conversion of 1,2-dichloropropane is given in the Table following the examples. The unused catalyst and the aged catalyst were also tested under the same conditions. The results are also given in the Table.

Regeneration Example 2

A deactivated Pd-Al$_2$O$_3$-SiO$_2$ catalyst with 4% by weight of palladium and 43% by weight of silica is flushed immediately after the catalytic hydrodechlorination of 1,2-dichloropropane at the last operating temperature of 260° C. with 60 L/h of hydrogen for 2.5 hours. After that, the catalyst is heated under the same flow conditions at a rate of 5° C./min to 490° C. At this temperature, the catalyst is treated for 4 hours with hydrogen. Subsequently, the catalyst is inactivated with nitrogen and cooled to 420° C. When hydrogen can no longer be detected at the outlet of the reactor, the catalyst is treated at a loading of 900 v/vh at temperatures of 420° to 490° C. in each case for 2.5 hours with mixtures of oxygen and nitrogen of increasing oxygen content in the sequence: 0.3, 0.7, 1.4, 3.2, 6.5 and 15% by volume of oxygen. An analysis of the waste gases revealed no dioxin.

After the regenerated catalyst is cooled to room temperature, it is analyzed with respect to the catalytic hydrodechlorination activity using the test method described in Example 1. The activity values of the unused catalyst and of the deactivated catalyst were also determined. The data are compared in the Table below, which shows that the deactivated catalysts are completely inactive under the experimental conditions chosen. Extreme reaction conditions were selected in order to be able to measure in the partial conversion range.

A comparison of the activities of unused and regenerated catalysts shows that the activity level of the unused catalyst is regained in both examples by the regeneration thereof.

TABLE

Comparison of the catalytic activities of unused, deactivated and regenerated catalysts

| | Conversion of 1,2-Dichloropropane in % | | |
|---|---|---|---|
| | Unused | Deactivated | Regenerated |
| Example 1 | 12.7 | 0 | 12.8 |
| Example 2 | 58.4 | 0 | 58.6 |

Having described preferred embodiments of the invention, it is to be understood that the invention is not limited to those precise embodiments, and that various changes and modifications may be effected therein by one skilled in the art without departing from the scope or spirit of the invention as defined in the appended claims.

We claim:

1. A method for catalytic hydrodechlorination of a reaction gas predominantly composed of chlorinated hydrocarbons, the method comprising:

catalytically dechlorinating said reaction gas in a first step, said first step being carried out in at least one tubular reactor at a first temperature in a range between about 80° and 230° C., said tubular reactor including at least one tube, said at least one tube containing a first catalyst at a catalyst loading of between about 0.1 and 1.5 v/vh, a periphery of said at least one tube being cooled an amount yielding a radial temperature difference not exceeding 40° C. therein, said first step including a first hydrogen excess in a range between about 1.2 and 2.0 based upon a stoichiometric consumption, said first step producing a stream of partially dechlorinated reaction gas;

introducing said stream of partially dechlorinated reaction gas output from said at least one tubular reactor in a straight transit to a fixed bed reactor for further catalytic dechlorination in a second step carried out in said fixed bed reactor, said fixed bed reactor being operated at a second temperature in a range between about 200° and 350° C., said second step including a second hydrogen excess in a range between about 2 and 100 based upon said stoichiometric consumption, said fixed bed reactor containing a second catalyst in an amount according to a ratio of catalyst volume between that of said first step and said second step in a range between about 2:1 and 10:1; and maintaining a pressure in said tubular reactor and in said fixed bed reactor in a range between about 1 to 50 bar resulting in the production of saturated hydrocarbons.

2. The method according to claim 1, wherein said first catalyst is different from said second catalyst.

3. The method according to claim 1, wherein said first hydrogen excess is in a range between about 1.2 and 1.5, and said second hydrogen excess is in a range between about 10 to 50, both ranges based upon said stoichiometric consumption.

4. The method according to claim 1, wherein at least one tube has an internal diameter of about 1 5 to about 50 mm.

5. The method according to claim 1, wherein said tubular reactor is cooled by means of evaporative cooling.

6. The method according to claim 5, wherein said evaporative cooling is achieved by evaporation of one of chlorinated hydrocarbons or a mixture of predominantly chlorinated hydrocarbons.

7. The method according to claim 5, wherein said reaction gas is a vapor phase of an industrial mixture, and said evaporative cooling permits removal of higher boiling components.

8. The method according to claim 5, wherein said reaction gas is a vapor phase of an industrial mixture, and said evaporative cooling yields a distillative concentration of chlorinated hydrocarbons in said reaction gas.

9. The method according to claim 1, wherein said fixed bed reactor is run adiabatically.

10. The method according to claim 1, further comprising introducing an oxygen-containing gas into said stream of partially dechlorinated reaction gas output from said at least one tubular reactor prior to its introduction into said fixed bed reactor, whereby said gas stream is increased from said first temperature to said second temperature.

11. The method according to claim 1, wherein said at least one tubular reactor and said fixed bed reactor are started up simultaneously by heating in the presence of hydrogen.

12. The method according to claim 1, wherein, following a deactivation of either of said first and second catalysts by operation of said method over a period of time, regeneration of said deactivated catalyst comprises the steps of:

heating said deactivated catalyst in a stream of hydrogen to maintain not less than a last operating temperature thereof over a first period of time in a range from about 0.5 to about 10 hours;

further heating said deactivated catalyst in said stream of hydrogen to a temperature in an elevated range between about 350° and 530° C.;

flushing said deactivated catalyst at a temperature within said elevated range in said stream of hydrogen for a second period of time between about 1 and 10 hours;

discontinuing said flow of hydrogen;

inactivating said deactivated catalyst in a stream of nitrogen; and treating said deactivated catalyst in stepwise fashion in a stream of an oxygen-containing inert gas mixture at a treatment temperature in a range of between about 350° and 500° C.

13. The method according to claim 12, wherein said elevated range is between about 420° and 490° C.

14. The method according to claim 12, wherein each of said streams of hydrogen, nitrogen and said oxygen-containing inert gas mixture are introduced at a selected flow rate related to catalyst volume in a flow loading range between about 100 and 10,000 v/vh.

15. The method according to claim 14, wherein said flow loading range is between about 500 and 2,000 v/vh.

16. A method for catalytic hydrodechlorination of a reaction gas predominantly composed of chlorinated hydrocarbons, the method comprising:

a first step of introducing said reaction gas and a first amount of hydrogen into a first reaction chamber containing a first catalyst, said first amount of hydrogen being in excess of a stoichiometric consumption, said reaction chamber being held at a first temperature, there being no more than a 40° C. temperature differential throughout said reaction chamber; and a second step of transferring an output of said first reaction chamber to a second reaction chamber in which a second amount of hydrogen is introduced in excess of said stoichiometric consumption, said reaction chamber containing a second catalyst, said reaction chamber being held at a second temperature treater than said first temperature resulting in the production of saturated hydrocarbons.

17. The method according to claim 16, wherein a pressure in said first and second reaction chambers is maintained in a range between about 1 to 50 bar.

18. The method according to claim 16, wherein said first temperature is in a range between about 80° and 230° C., and said second temperature is in a range between about 200° and 350° C.

19. The method according to claim 16, wherein said first catalyst is present in a catalyst loading of between about 0.1 and 1.5 v/vh, and said second catalyst is present in an amount according to a ratio of catalyst volume between that of said first step and said second step in a range between about 2:1 and 1 0:1.

* * * * *